Oct. 15, 1929.   G. A. DALTON   1,732,084

PULLEY BLOCK

Filed March 11, 1927

Inventor:
George A. Dalton,
by his Attorneys
Howson & Howson

Patented Oct. 15, 1929

1,732,084

UNITED STATES PATENT OFFICE

GEORGE A. DALTON, OF HIGHLAND PARK, NEW JERSEY, ASSIGNOR TO JOHN WALDRON CORPORATION, OF NEW BRUNSWICK, NEW JERSEY, A CORPORATION OF NEW JERSEY

PULLEY BLOCK

Application filed March 11, 1927. Serial No. 174,558.

This invention relates to improvements in pulley blocks, and has for its principal object the provision of a block of novel construction facilitating the removal or attachment of the rope or cable with which the block may be used.

With reference to the drawings, the block comprises the usual sheave 1 which is journaled on a stud 2 extending between a pair of links 3 and 4 which constitute the arms of the sheave yoke, the said arms being connected at the top by a cross pin 5.

Figure 1:
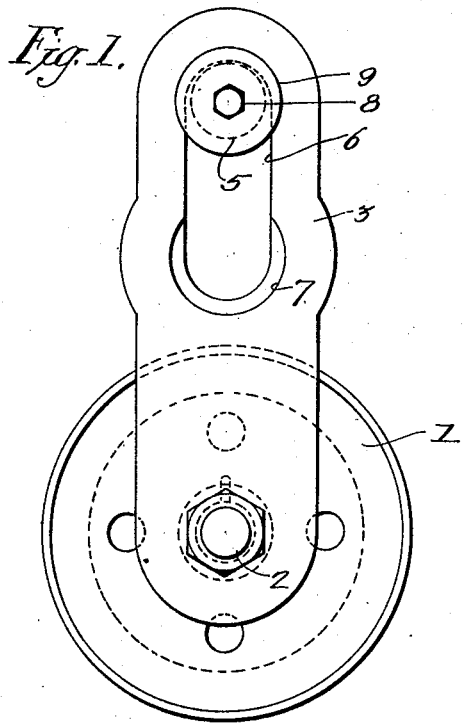
Figure 1 is a side view of a block made in accordance with my invention.

This yoke 3—4—5, instead of being made in the usual integral form, is so constructed that at least one of the arms is detachable from the cross piece 5 to permit the passage of a cable or rope over the sheave without requiring that the end thereof be passed through the yoke and drawn into the desired position. In the present instance, the upper ends of the links 3 and 4 are slotted longitudinally, as indicated at 6 in Figs. 1 and 3, and the lower end of the slot 6 in the arm 3 is enlarged as indicated at 7, for a purpose hereinafter described. The connecting pin 5 is cylindrical in the present instance and projects through the slots 6 in the links 3 and 4, as illustrated in Fig. 2, and the pin has secured to the ends thereof by means of bolts 8 retaining disks or washers 9 of a diameter greater than the width of the slot 6.

Figure 2:
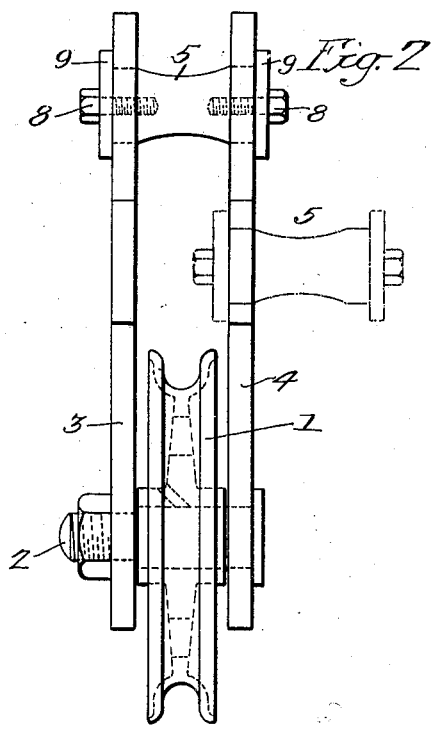
Fig. 2 is a front view of the block.
Figure 3:
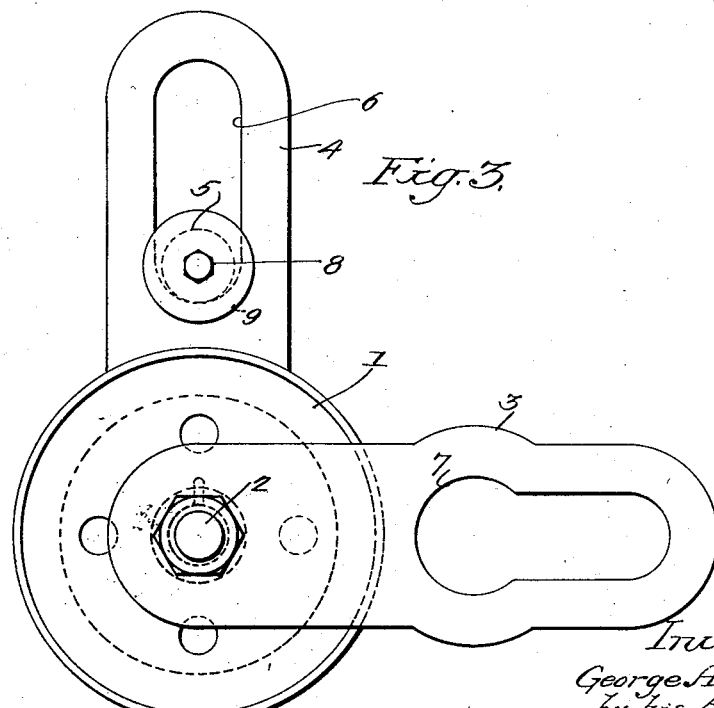
Fig. 3 is a side view of the block showing the parts separated for reception of the rope or cable.

The diameter of the washer 9 at the outside of the link 3, however, is such as to permit the passage of this washer through the enlarged lower end 7 of the slot 6 in that link, so that by shifting the pin 5 towards the sheave and to the lower ends of the slots 6, the pin may be withdrawn axially from the link 3, as indicated in broken lines in Fig. 2, thereby disconnecting the links 3 and 4 and as may be seen from Fig. 3 permitting the passage of the rope or cable over the sheave. Thereafter the links may be reconnected through the medium of the pin 5 in obvious manner.

The advantage of a block of this construction will be obvious. In the present form of block containing an integral fixed yoke, it is necessary to apply the rope or cable by passing one end of the latter through the yoke and drawing it into the desired position. In the present instance, any part of the rope or cable intermediate the ends may be applied directly to the sheave by merely disconnecting the arms 3 and 4, as described above.

I claim:

A pulley block comprising a yoke consisting of a pair of longitudinally slotted arms, an element pivotably securing said arms together, a pin projecting through said slots and having at the outside of said arms enlarged heads normally preventing withdrawal of the pin through the slots, one of said slots being enlarged in part to permit withdrawal of said connecting pin, and a sheave wheel journaled on said element between the said arms.

GEORGE A. DALTON.